United States Patent [19]

Nishida et al.

[11] Patent Number: 5,822,762
[45] Date of Patent: *Oct. 13, 1998

[54] INFORMATION PROCESSING DEVICE WITH DECISION CIRCUITS AND PARTITIONED ADDRESS AREAS

[75] Inventors: Syuji Nishida; Seiji Suetake; Shunsuke Kamijo; Kenji Furuya, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 533,965

[22] Filed: Sep. 26, 1995

[30] Foreign Application Priority Data

Dec. 12, 1994 [JP] Japan .................................. 6-307230

[51] Int. Cl.⁶ .................................................. G06F 12/08
[52] U.S. Cl. .......................................... 711/139; 711/170
[58] Field of Search .................................. 395/466, 456, 395/465, 403, 490; 711/139, 138, 129, 163, 3, 170, 173

[56] References Cited

U.S. PATENT DOCUMENTS

| | | | |
|---|---|---|---|
| 4,899,275 | 2/1990 | Sache et al. | 395/403 |
| 5,091,850 | 2/1992 | Culley | 395/403 |
| 5,157,774 | 10/1992 | Culley | 395/466 |
| 5,255,384 | 10/1993 | Sachs et al. | 395/417 |
| 5,327,545 | 7/1994 | Begun et al. | 395/460 |
| 5,561,814 | 10/1996 | Glew et al. | 395/833 |
| 5,586,296 | 12/1996 | Bernstein et al. | 395/465 |
| 5,625,793 | 4/1997 | Mirza | 395/465 |

FOREIGN PATENT DOCUMENTS 02-45846 2/1990 Japan .
05-28040 5/1993 Japan .

Primary Examiner—Tod R. Swann
Assistant Examiner—Conley B. King, Jr.
Attorney, Agent, or Firm—Nikaido, Marmelstein, Murray & Oram LLP

[57] ABSTRACT

An information processing device includes a central processing unit, a cache memory unit and first and second decision circuits. The first decision circuit identifies one of partitioned address areas to be accessed before the central processing unit accesses the cache memory unit. The second decision circuit determines whether the above one of the partitioned address areas is a cachable area or a non-cachable area before address tag data is referred to in the cache memory unit.

3 Claims, 20 Drawing Sheets

(A) 2-PHASE CLOCK SIGNALS
(B) CACHE ACCESS ADDRESS
(C) ADDRESS TAG LOOK UP
(D) EXTERNAL ACCESS ADDRESS
(E) EXTERNAL ACCESS ADDRESS (A) 2-PHASE CLOCK SIGNALS
(B) CACHE ACCESS ADDRESS
(C) ADDRESS TAG LOOK UP
(D) ACCESSED ADDRESS AREA DECISION
(E) CACHABL AREA/NON-CACHEABLE AREA INDICATION REGISTER LOOK UP
(F) EXTERNAL ACCESS ADDRESS
(G) EXTERNAL ACCESS REQUEST

INFORMATION PROCESSING DEVICE WITH DECISION CIRCUITS AND PARTITIONED ADDRESS AREAS

BACKGROUND OF THE INVENTION

1. Field of the Invention

The present invention generally relates to an information processing device equipped with a cache memory used by a central processing unit (CPU). Examples of such an information processing device are a microprocessor and a microcomputer.

2. Description of the Related Art

FIG. 1 is a block diagram of a first conventional information processing device, which is made up of a CPU 1, an address bus 2 for transferring an address signal output by the CPU 1, and a cache memory 3 used by the CPU 1. The cache memory 3 is equipped with a hit/miss decision circuit 4 which determines whether an access to the cache memory 3 from the CPU 1 is a cache hit or a cache miss. An address bus 5 for transferring an address signal for an external address output from the cache memory 3 extends from the cache memory 3. An external access request signal line 6 which transfers an external access request signal output from the cache memory 3 extends from the cache memory 3.

Generally, a control register for an external resource, which may be a DMA (Direct Memory Access) controller, is designed so that the contents thereof can be changed without the CPU 1. Hence, it is difficult to ensure coherency to the cache memory 3. Hence, in an information processing device as described above, generally, an address area in which information that cannot be written into the cache memory 3 by an instruction access by the CPU 1 is stored is defined as a non-cachable area. For example, the control register for an external resource is defined as the non-cachable area.

The cache memory 3 is configured so as to refer to an address tag rather than determine whether an access from the CPU 1 is directed to the non-cachable area. Hence, when it is determined that the access is addressed to the non-cachable area, the access is determined as the cache miss in the cache memory 3, and thereafter an external access is carried out.

FIG. 2 is a timing chart of an operation in the case where an access to the cache memory 3 by the CPU 1 is addressed to a non-cachable area in the cache memory 3. Part (A) of FIG. 2 shows clock signals $\phi_1$ and $\phi_2$ having respective phases and serving as operation clocks. Part (B) of FIG. 2 shows a cache access address output to the cache memory 3 from the CPU 1. Part (C) of FIG. 2 shows an address tag look-up operation in the cache memory 3 in which a high level corresponds to the active state). Part (D) of FIG. 2 shows an external access address output from the cache memory 3, and part (E) thereof shows an external access request signal output from the cache memory 3 (a high level thereof is the active level).

When the CPU 1 accesses the cache memory 3, the cache access address is output to the cache memory 3 from the CPU 1. Upon receipt of the cache access address, the address tag regarding the cache access address is looked up in the cache memory 3 without determining whether the access from the CPU 1 is addressed to the non-cachable area. If the access from the CPU 1 is addressed to the non-cachable area, the hit/miss decision circuit 4 determines that the access is a cache miss. Then, the external access address for accessing an external memory is output from the cache memory 3, and the external address request signal for requesting an access to the external memory is switched to the high level.

As described above, in the first device shown in FIG. 1, the access to the non-cachable area in the cache memory 3 from the CPU 1 is processed so that the hit/miss decision circuit 4 determines that the access is a cache miss and thereafter the external access is performed.

FIG. 3 is a block diagram of a second conventional information processing device, which includes a CPU 8, an address bus 9 for transferring an address signal output by the CPU 8, and a cache memory unit 10 used by the CPU 8. The cache memory unit 10 is equipped with a hit/miss decision circuit which the access from the CPU 8 is a cache hit or a cache miss. The cache memory unit 10 is further equipped with a cachable area/non-cachable area decision circuit 12. The circuit 12 has the function of determining in which one of address areas among address areas partitioned beforehand the address area of the access requested by the CPU 8 falls. Further, the circuit 12 has the function of determining whether the address area of the access requested by the CPU 8 is a cachable area by referring to a cachable area/non-cachable area indicating register (not shown) which has data indicating whether the address area of the access requested by the CPU 8 is a cachable area. The cache memory unit 10 has an OR circuit 13, which performs an OR operation on the output signal of the hit/miss decision circuit 11 and the output signal of the decision circuit 12.

The hit/miss decision circuit 11 switches its output signal to a low level when the access from the CPU 8 is a cache hit, and switches the output signal to the high level when the access is a cache miss. The decision circuit 12 switches its output signal to the low level when the access from the CPU 8 is addressed to the cachable area, and switches the output signal to the high level when the access is addressed to the non-cachable area. In short, the cache memory unit 10 determines whether the access from the CPU 8 is a cache hit and whether the above access is addressed to the cachable area.

An address bus 14 that transfers the address signal for an external address output from the cache memory unit 10 extends from the cache memory unit 10. An external access request signal line 15 that transfers an external access request signal output from the cache memory unit 10 extends from the cache memory unit 10.

FIG. 4 is a timing chart of an operation in a case where an access to the cache memory unit 10 by the CPU 8 is addressed to a non-cachable area in the second conventional device. Part (A) of FIG. 4 shows clock signals $\phi_1$ and $\phi_2$ having respective phases and serving as operation clocks. Part (B) of FIG. 4 shows a cache access address output to the cache memory 3 from the CPU 1. Part (C) of FIG. 4 shows an address tag look-up operation in the cache memory 3 in which a high level corresponds to the active state). Part (D) of FIG. 4 shows an address area decision operation on the access requested by the CPU 8, the operation being performed in the cache memory unit 10 (the high level of the signal shown in part (D) is the active state). Part (E) of FIG. 4 shows a cachable area/non-cachable area indicating register loop-up operation in the cache memory unit 10 (the high level of the signal shown in part (E) is the active state). Part (F) of FIG. 4 shows the external access address output from the cache memory unit 10. Part (G) of FIG. 4 shows the external access request signal output from the cache memory unit 10 (the high level is the active level).

When the CPU 8 accesses the cache memory unit 10, the CPU 8 outputs the cache access address to the cache memory unit 10. Upon receipt of the cache access address, the decision circuit 12 in the cache memory unit 10 makes a decision on the address area of the access requested by the CPU 8. Subsequently, the cachable area/non-cachable area indicating register 12 is referred to, and the address area accessed by the CPU 8 is addressed to the cachable area. Further, in the cache memory unit 10, the address tag is looked up independently of the decision operation on the accessed address area and the register loop-up operation.

When the decision circuit 12 determines that the access from the CPU 8 is addressed to the non-cachable area, the output of the decision circuit 12 is switched to the high level before the hit/miss decision circuit 11 switches its output signal to the high level. As a result, the external access address for an external access is output from the cache memory unit 10, and the external access request signal is switched to the high level.

As described above, in the second conventional device, the access to the non-cachable area from the CPU 8 can be determined as an access to the non-cachable area by means of the decision circuit 12 ½ cycle before the access is determined as a cache miss by means of the hit/miss decision circuit 11. Hence, when the cache-inhibit area is accessed by the CPU 8, the external access can be advanced by ½ cycle.

FIG. 5 is a block diagram of a third conventional device, which includes a CPU 17, address buses 18 and 19, data buses 20 and 21, a cache memory unit 22 having a block transfer function, and a peripheral circuit 24 which may be a serial I/O. A main memory 23 is connected, as an external device, to the information processing device. The block transfer function transfers a group of blocks, e.g., four blocks at one time.

When a data read request to the cache memory unit 22 is issued by the CPU 17, the requested data is transferred to the CPU 17 from the cache memory unit 22 via the data bus 20 if the requested data is in the cache memory unit 22 (in the case of cache hit). If the requested data is not in the cache memory unit 22 (in the case of cache miss), a block transfer of data is performed.

FIG. 6 is a timing chart of the block transfer operation of the third conventional device. FIGS. 7 and 8 are block diagrams of the block transfer operation of the third conventional device. These figures relate to a case where a read access to the cache memory unit 22, for example, address A00, while data D00 is not present at address A00 of the cache memory unit 22.

At the commencement of the block transfer operation, as shown in FIGS. 6 and 7, the read access to address A00 is given to the main memory 23 by the CPU 17. Hence, data D00 of address A00 is output from the main memory 23 and transferred to the cache memory unit 22 and the CPU 17. Thereafter, as shown in FIGS. 6 and 8, read accesses to addresses A01, A02 and A03 are sequentially performed from the cache memory unit 22 to the main memory 23, and data D01, D02 and D03 of addresses A01, A02 and A03 are transferred to the cache memory unit 22.

The CPU 17 is in the waiting state until data D00 related to the data read request issued for itself. When data D00 is transferred and received, the CPU 17 proceeds with an operation on data D00 in parallel with the block transfer operation in the cache memory unit 22.

However, the above first, second and third conventional devices have the following respective problems.

As to the first device shown in FIG. 1, the external access is not allowed until the loop-up operation of the address tag is completed and the access is determined as a cache miss when the CPU 1 accesses a non-cachable area in the cache memory unit 3. Hence, it takes a long time to start the external access. Further, the address tag is referred to each time the CPU 1 accesses the cache memory unit 3. This leads to an increase in power consumption.

As to the second device shown in FIG. 3, as compared with the first device, the external access can be started by ½ cycle when an access to the cache memory unit 10 by the CPU 8 is addressed to a non-cachable area. However, the address area indicated by the access request by the CPU 8 is started after the cache access address from the CPU 8 is received. As a result, there is not a sufficient time between the completion of the cachable area/non-cachable area indication register look-up operation and the start of the external access operation. The interval between the completion of the cachable area/non-cachable area indication register look-up operation and the start of the external access operation therefore becomes a critical path, which prevents speeding-up of the operation of the device. Further, the address tag is referred to each time the CPU 8 accesses the cache memory unit 10, as in the case of the first device. This leads to an increase in power consumption.

The problems of the third device are as follows. The operation on data D00 in the CPU 17 and the block transfer of data D01, D02 and D03 from the main memory 23 to the cache memory unit 22 are concurrently carried out. In this case, the address bus 19 and the data bus 21 are occupied by the cache memory unit 22. If an access to the peripheral circuit by address A10 is needed by the CPU 17 while the block transfer operation on data D01, D02 and D03 is being performed from the main memory 23 to the cache memory unit 22, address A10 is output by the CPU 17 as shown in FIG. 6. However, the CPU 17 cannot be allowed to access the peripheral circuit 24 until the block transferring of data D01, D02 and D03 from the main memory 23 to the cache memory unit 22 is completed. Hence, it takes a long time to obtain data D10 via the peripheral circuit 24 and hence the processing speed is reduced.

SUMMARY OF THE INVENTION

It is a general object of the present invention to provide an information processing device in which the above problems are eliminated.

A more specific object of the present invention is to provide an information processing device capable of operating at a higher speed.

The above objects of the present invention are achieved by an information processing device comprising:

a central processing unit;

a cache memory unit;

a first decision circuit which identifies one of partitioned address areas to be accessed before the central processing unit accesses the cache memory unit; and a second decision circuit which determines whether the above one of the partitioned address areas is a cachable area or a non-cachable area before address tag data is referred to in the cache memory unit.

According to one aspect, the first decision circuit is provided in the central processing unit; and the second decision circuit is provided in the cache memory unit.

According to another aspect, the first decision circuit and the second decision circuit are provided in the cache memory unit.

The above objects of the present invention are also achieved by an information processing device comprising:

a central processing unit;

a cache memory unit having a block transfer function in which blocks of data are transferred; and a peripheral circuit connected to an address bus and a data bus, which connect the central processing unit and the cache memory unit together.

According to one aspect, the cache memory unit includes a plurality of memory parts, each of which can be set to either a cache memory mode or a RAM mode.

DESCRIPTION OF THE PREFERRED EMBODIMENTS

A description will now be given, with reference to FIG. 9, of an information processing device according to a first embodiment of the present invention. The information processing device shown in FIG. 9 includes a CPU 26 and an address bus 27 which transfers an address signal output by the CPU 26. The CPU 26 has accessed address area decision unit 28, which can be implemented by hardware or software. The entire address area is partitioned in a predetermined number of parts. In the following description of the first embodiment of the present invention, the entire address area is partitioned in eight address areas. The decision unit 28 determines to which one of the eight address areas the access by the CPU 26 belongs. An accessed address area decision signal line 29 extends from the decision unit 28 in the CPU 26, and carries an accessed address area decision signal NCA, which consists of three bits and indicates the address area accessed by the CPU 26.

Figure 1:
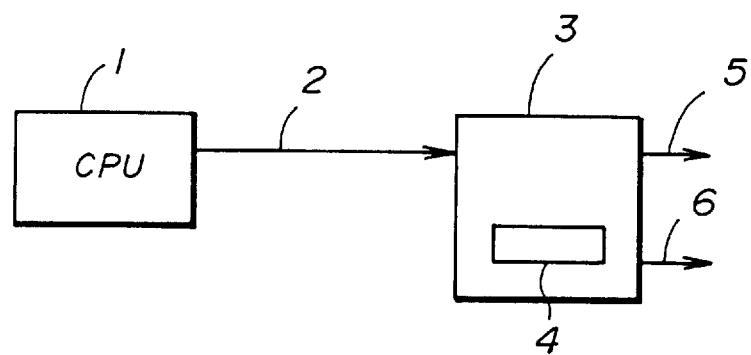
FIG. 1 is a block diagram of a first conventional information processing device.
Figure 2:
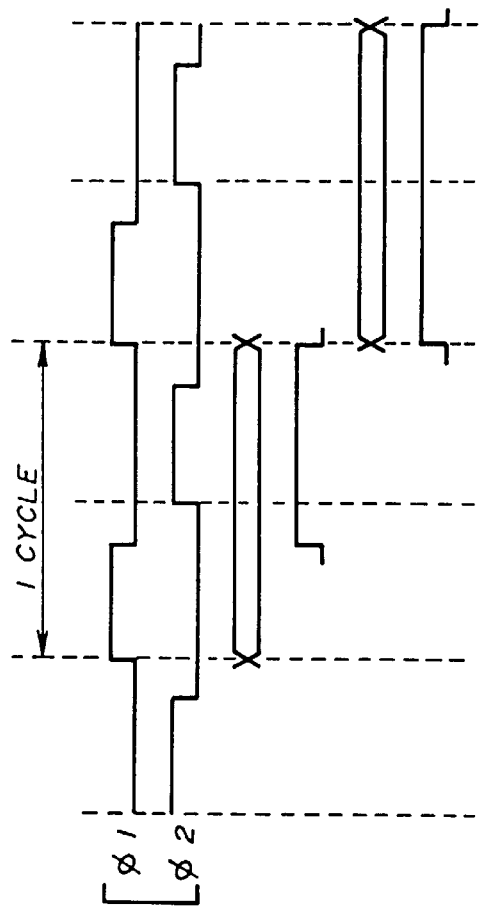
FIG. 2 is a timing chart of an operation of the first device shown in FIG. 1.
Figure 3:
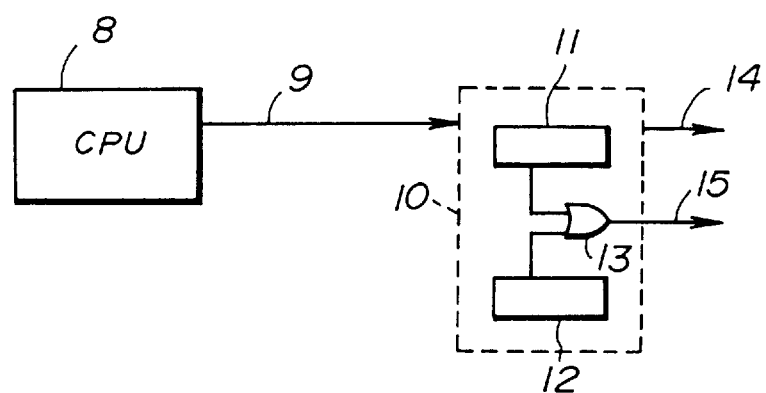
FIG. 3 is a block diagram of a second conventional information processing device.
Figure 4:
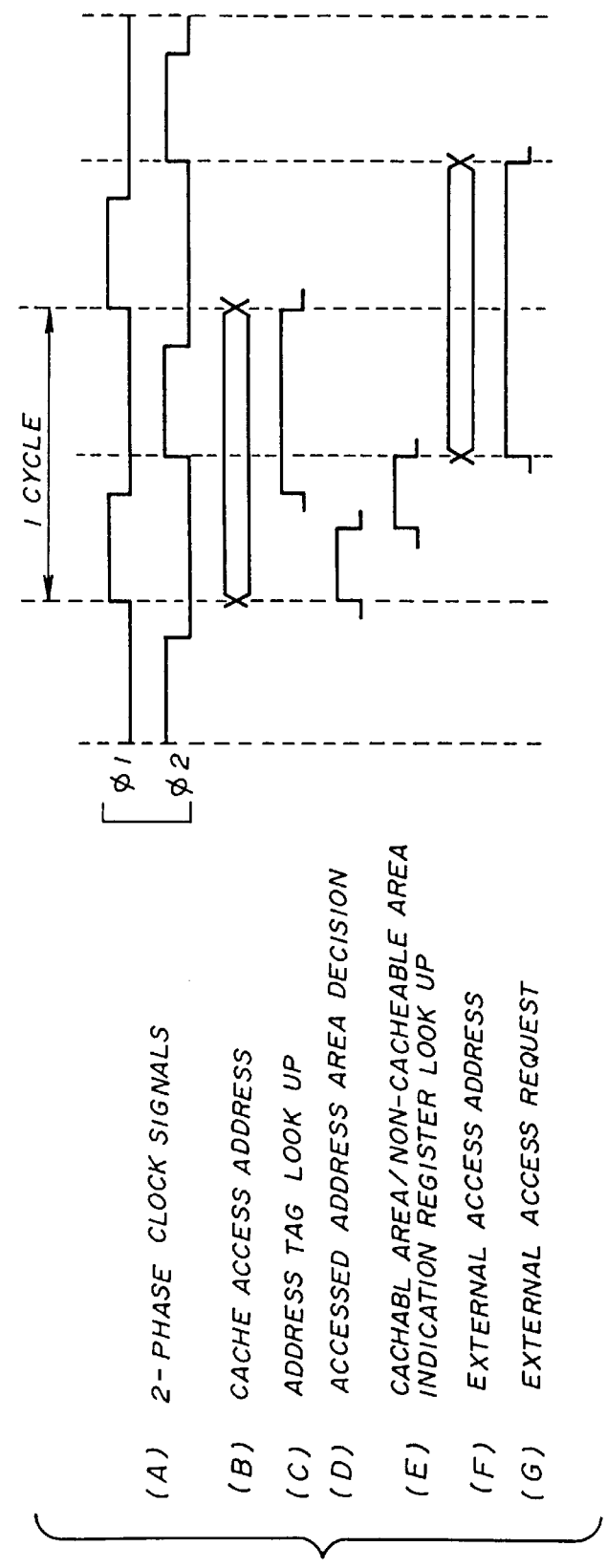
FIG. 4 is a timing chart of an operation of the second device shown in FIG. 1.
Figure 5:
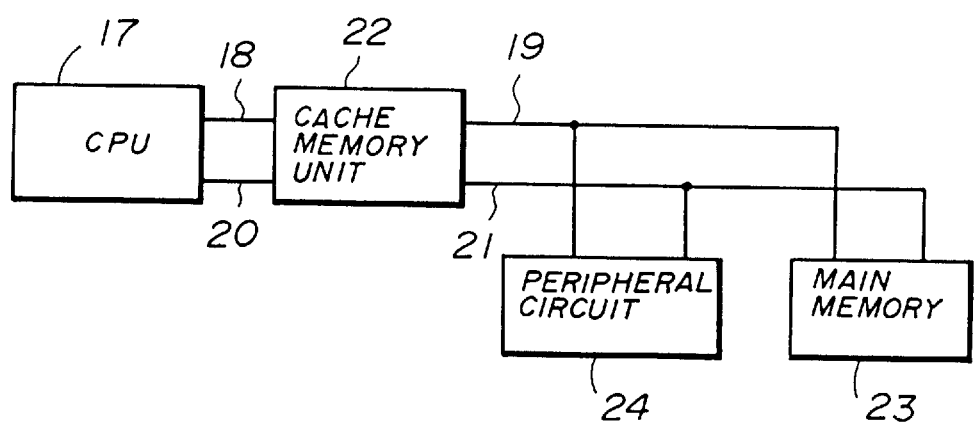
FIG. 5 is a block diagram of a third conventional information processing device.
Figure 6:
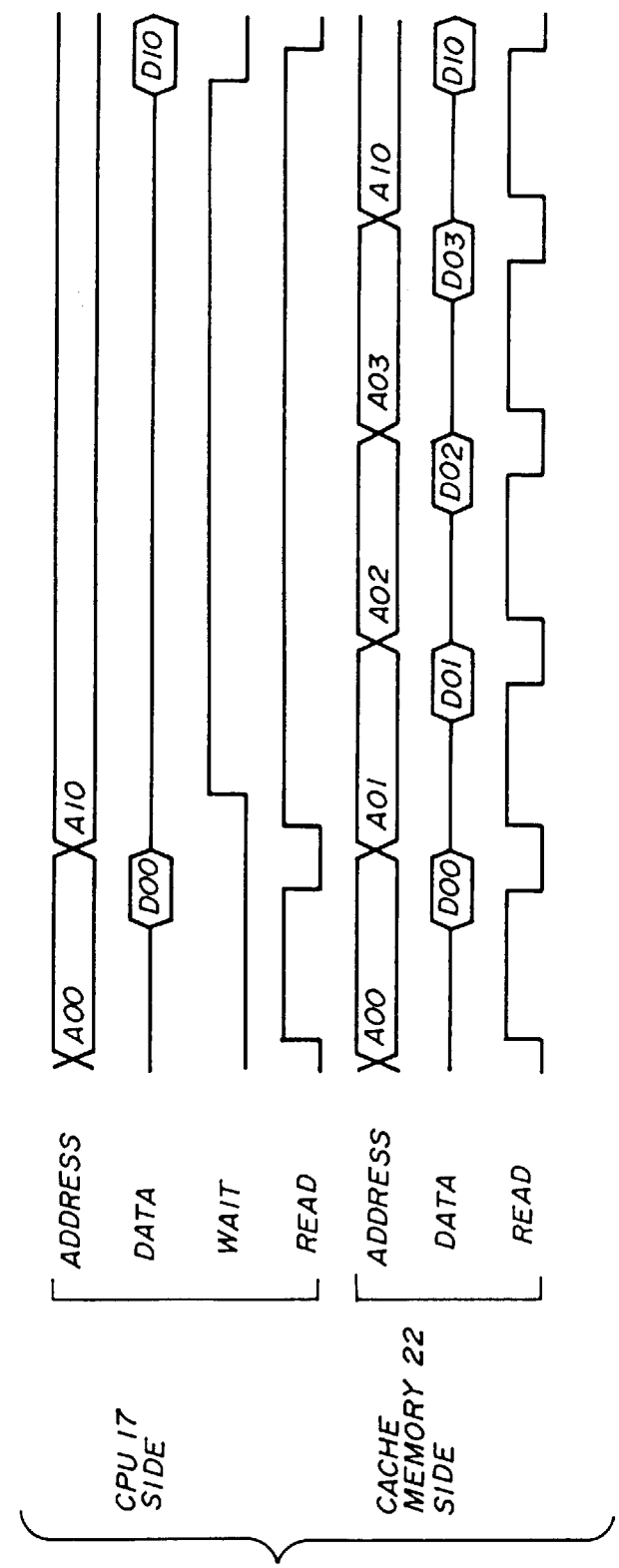
FIG. 6 is a timing chart of an operation of the third device shown in FIG. 5.
Figure 7:
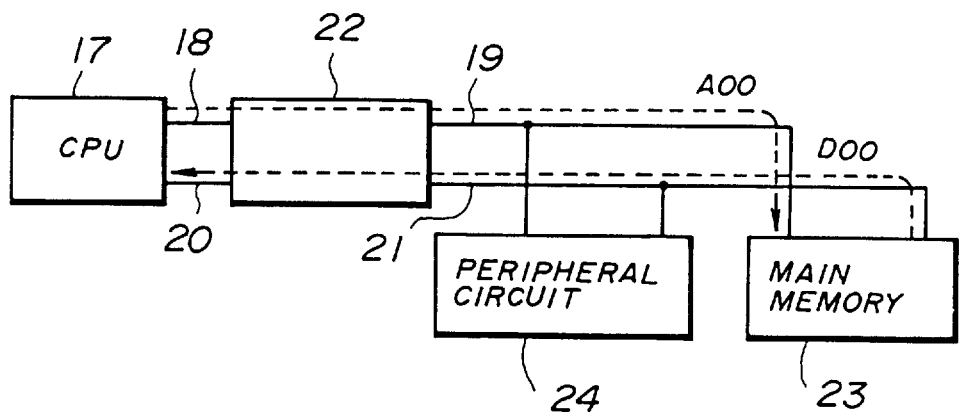
FIGS. 7 and 8 are block diagrams of a block transfer operation of the third device shown in FIG. 5.
Figure 8:
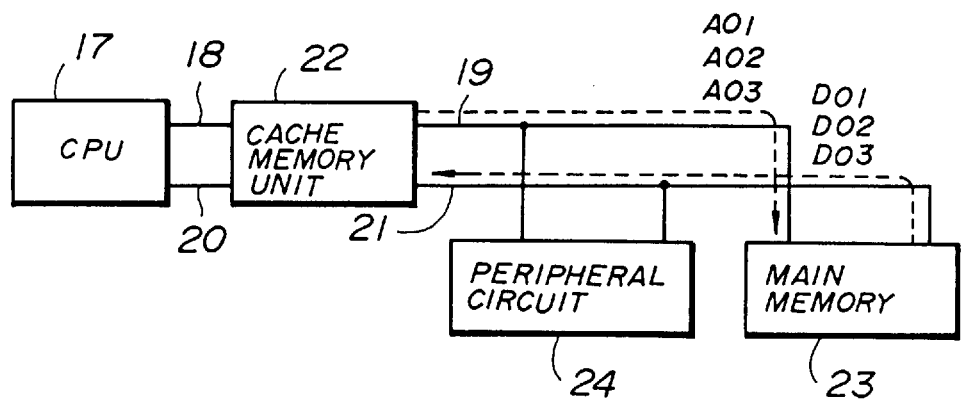
Figure 9:
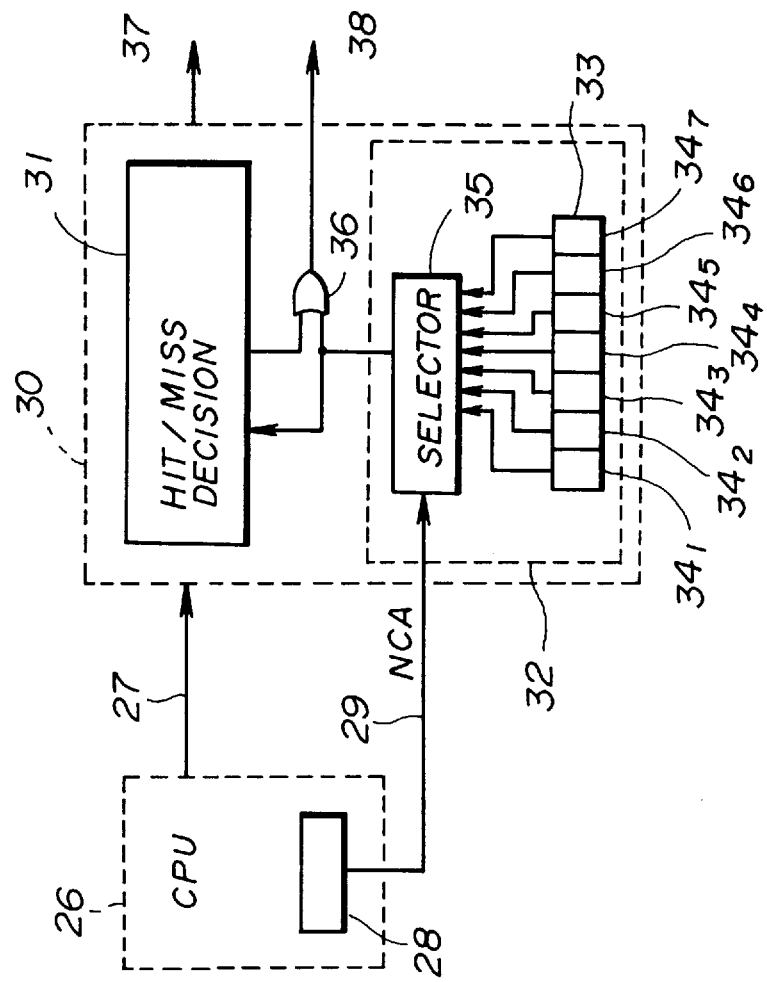
FIG. 9 is a block diagram of an information processing device according to a first embodiment of the present invention.

The device shown in FIG. 9 includes a cache memory unit 30 used by the CPU 26, which includes a hit/miss decision circuit 31. The circuit 31 determines whether the access by the CPU 26 is a cache hit or a cache miss. The hit/miss decision circuit 31 outputs "0" (which corresponds to a low level) in the case of the cache hit, and outputs "1" (which corresponds to a high level) in the case of the cache miss. The cache memory unit 30 includes a cachable area/non-cachable area decision circuit 32, which determines access by the CPU 26 is addressed to a cachable area.

The cachable area/non-cachable area decision circuit 32 includes a cachable area/non-cachable area indication register 33, which each of the partitioned address areas is a cachable area or non-cachable area. In the first embodiment of the present invention, the entire address area is partitioned in eight address areas. Further, the first address area is permanently defined as a non-cachable area according to the specification, and the second to eighth address areas can be respectively defined as either cachable or non-cachable areas by the users.

In correspondence with the above definition, the cachable area/non-cachable area indication register 33 has seven one-bit registers $34_1$–$34_7$ related to the second to eighth address areas. The one-bit registers $34_1$–$34_7$ respectively indicate whether the second to eighth address areas are cachable areas. The cachable area is indicated by "1", and the non-cachable area is indicated by "0".

The decision circuit 32 includes a selector 35, which selects one of the seven one-bit registers $34_1$–$34_7$ in accordance with the accessed address area decision signal NCA supplied from the CPU 26. The relation between the value of the three-bit signal NCA and one of the seven registers $34_1$–$34_7$ to be selected is defined in Table 1.

TABLE 1

| NCA | ONE-BIT REGISTER TO BE SELECTED |
|---|---|
| 000 | ("0" is output) |
| 001 | register $34_1$ |
| 010 | register $34_2$ |
| 011 | register $34_3$ |
| 100 | register $34_4$ |
| 101 | register $34_5$ |
| 110 | register $34_6$ |
| 111 | register $34_7$ |

As shown in Table 1, when the decision signal NCA indicates [000], there is no one-bit register to be selected and hence "0" is output.

When "1" is output from the selector 35, that is, when the address area indicated by the access request by the CPU 26 is determined as a non-cachable area, the hit/miss decision circuit 31 is made in the inactive state and the address tag look-up operation is inhibited.

The cache memory unit 30 includes an OR circuit 36, which performs an OR operation on the output signal of the hit/miss decision circuit 31 and the output of the cachable area/non-cachable area decision circuit 32, that is, the output of the selector 35, and produce a resultant external access request signal. An address bus 37 extends from the cache memory unit 30, and carries the address signal for an external access output from the cache memory unit 30. An external access request signal line 36 extends from the cache memory unit 30, and carries the external access request signal output from the cache memory unit 30.

Figure 10:
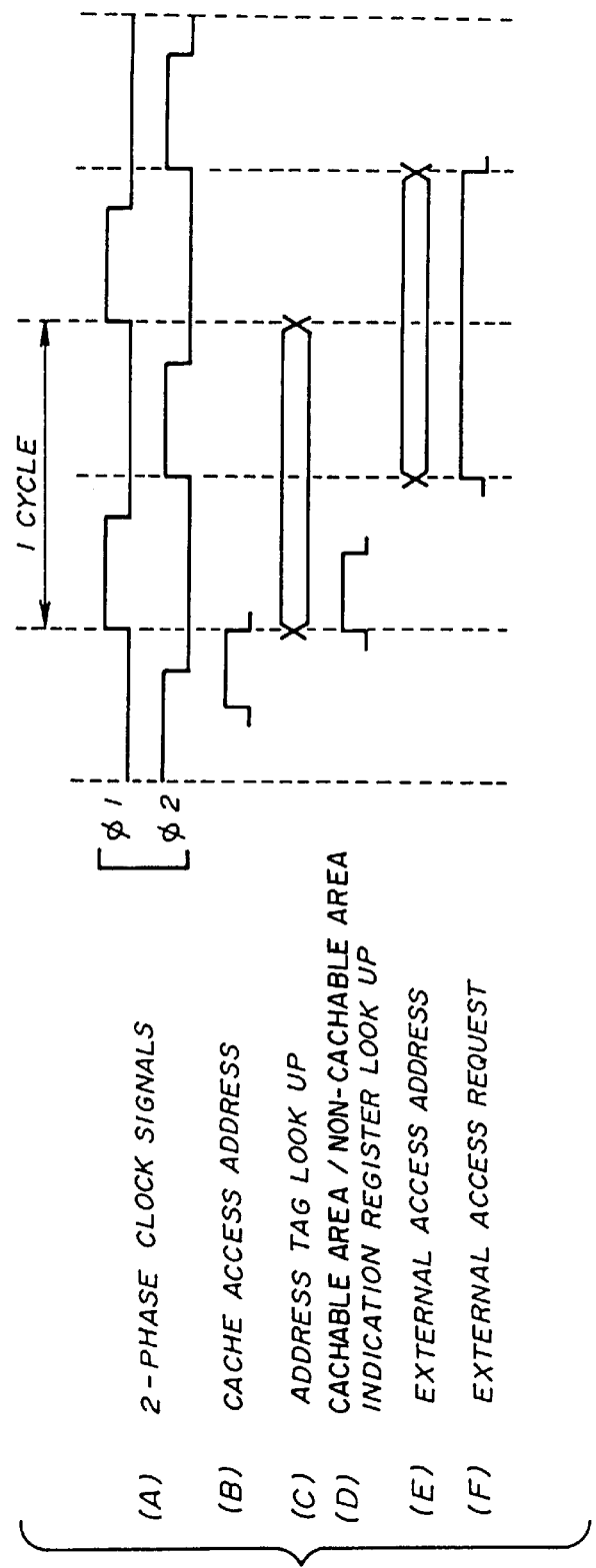
FIG. 10 is a timing chart of an operation of the information processing device shown in FIG. 9.

FIG. 10 is a timing chart of an operation performed when an access to the cache memory unit 30 by the CPU 26 is addressed to a non-cachable area. Part (A) of FIG. 10 shows clock signals $\phi_1$ and $\phi_2$ having respective phases and serving as operation clocks. Part (B) of FIG. 10 shows an accessed address area decision operation by the CPU 26. Part (C) of FIG. 10 shows the cache access address output by the CPU 26. Part (D) of FIG. 10 shows the cachable area/non-cachable area indication register look-up operation (the high level thereof indicates the active state), and part (E) thereof shows the external access address output from the cache memory unit 30. Further, part (F) of FIG. 10 shows the external access request signal output from the cache memory unit 30.

Figure 11:
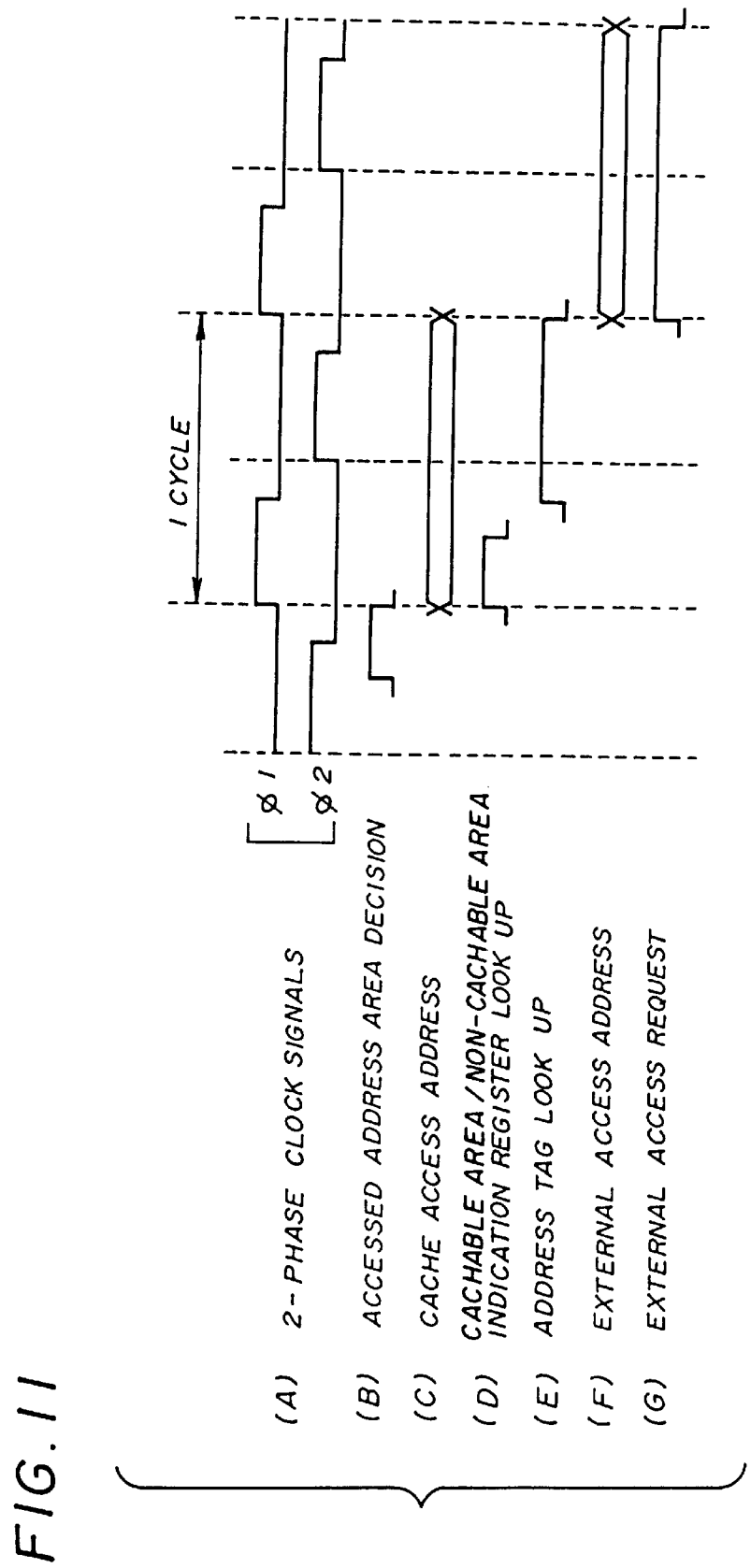
FIG. 11 is a timing chart of another operation of the information processing device shown in FIG. 9.

FIG. 11 is a timing chart of an operation performed when an access to the cache memory unit 30 by the CPU 26 is addressed to a cachable area and becomes a cache miss. More particularly, (A) of FIG. 11 shows clock signals $\phi_1$ and $\phi_2$ having respective phases and serving as operation clocks. Part (B) of FIG. 11 shows an accessed address area decision operation by the CPU 26. Part (C) of FIG. 11 shows the cache access address output by the CPU 26. Part (D) of FIG. 11 shows the cachable area/non-cachable area indication register look-up operation (the high level thereof indicates the active state), and part (E) thereof shows an address tag look-up operation (the high level thereof indicates the active state). Part (F) of FIG. 11 shows the external access address output from the cache memory unit 30. Further, part (G) of FIG. 11 shows the external access request signal output from the cache memory unit 30.

When the CPU 26 accesses the cache memory unit 30, the accessed address area decision circuit 28 makes a decision on the address area accessed by the CPU 26 before accessing. Thereafter, the CPU 26 outputs the cache access address to the cache memory unit 30, and outputs the accessed address area decision signal NCA indicating the accessed address area to the selector 35 of the cache memory unit 30.

In the cache memory unit 30, the cache access address is received, and it is determined whether the accessed address area is a cachable area by referring to the cachable area/non-cachable area indication register 33. The step of determining whether the accessed address area is a cachable area is as follows. When the signal NCA is [000], "0" is output from the selector 35. When the signal NCA is one of [001]–[111], the selector 35 outputs the indication data read from a corresponding one of the one-bit registers $34_1$–$34_7$ indicated by the signal NCA supplied from the CPU 26.

When the accessed address area is determined as a non-cachable area, as shown in FIG. 10, "1" is output from the selector 35, and the hit/miss decision circuit 31 is put into the inactive state. Thereby, the address tag loop-up operation is inhibited. The external access request signal output from the OR circuit 36 is switched to "1" (high level), and the external access address is output from the cache memory unit 30.

When the accessed address area is determined as a cachable area, as shown in FIG. 11, the address tag look-up operation is carried out, and the access request is a cache miss. Hence, the external access address for accessing the external memory is output from the cache memory unit 30, and the external access request signal for requesting an access to the external memory is switched to "1" (high level).

In the above-mentioned manner, the CPU 26 makes a decision on the address area to be accessed before accessing the cache memory unit 30. As a result, the cache memory unit 30 can determine whether the accessed address area is a cachable area immediately upon receipt of the accessed address area indication signal NCA supplied at the same time as the cache access address. Hence, there is a time delay between the completion of the cachable area/non-cachable area indication register look-up operation of the circuit 32 and the start of the external access operation. That is, the interval between the completion of the cachable area/non-cachable area indication register look-up operation and the start of the external access operation does not become a critical path, which prevents speeding-up of the operation. Further, the address tag is not referred to when an access to the cache memory unit 30 by the CPU 26 is addressed to a non-cachable area, and hence power consumption can be reduced.

In the above-mentioned first embodiment of the present invention, the cachable area/non-cachable area decision circuit 32 is provided in the cache memory unit 30. Alternatively, it is possible to provide the cachable area/non-cachable area decision circuit 32 in the CPU 26. In this case, it is possible to further speed up the process.

A description will now be given of an information processing device according to a second embodiment of the present invention.

Figure 12:
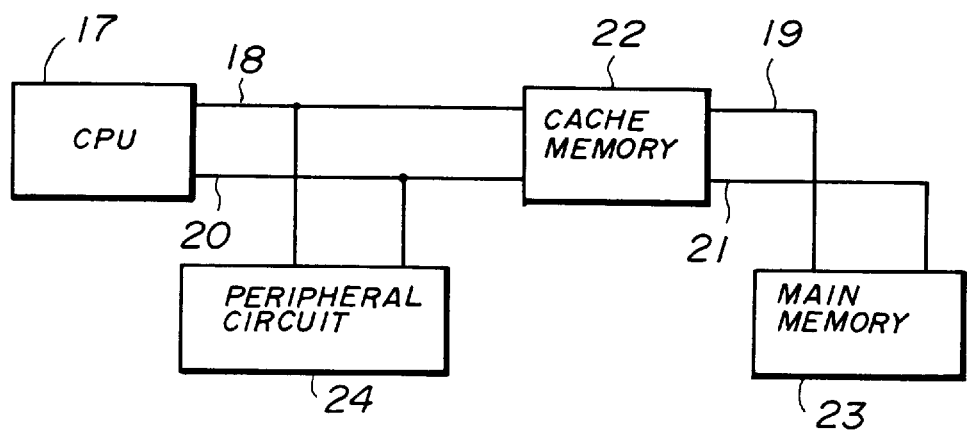
FIG. 12 is a block diagram of an information processing device according to a second embodiment of the present invention.

FIG. 12 shows such an information processing device, which includes the CPU 17, the cache memory unit 22 and the peripheral circuit 24. This peripheral circuit 24 connected to the address bus 18 and the data bus 20.

In a case where a data read request is issued to the cache memory unit 22 by the CPU 17, if the requested data is in the cache memory unit 22 (in the case of a cache hit), the requested data is transferred to the CPU 17 from the cache memory unit 22 via the data bus 20. In the above case, if the there is not requested data in the cache memory unit 22 (in the case of a cache miss), the block transfer of data is performed.

Figure 13:
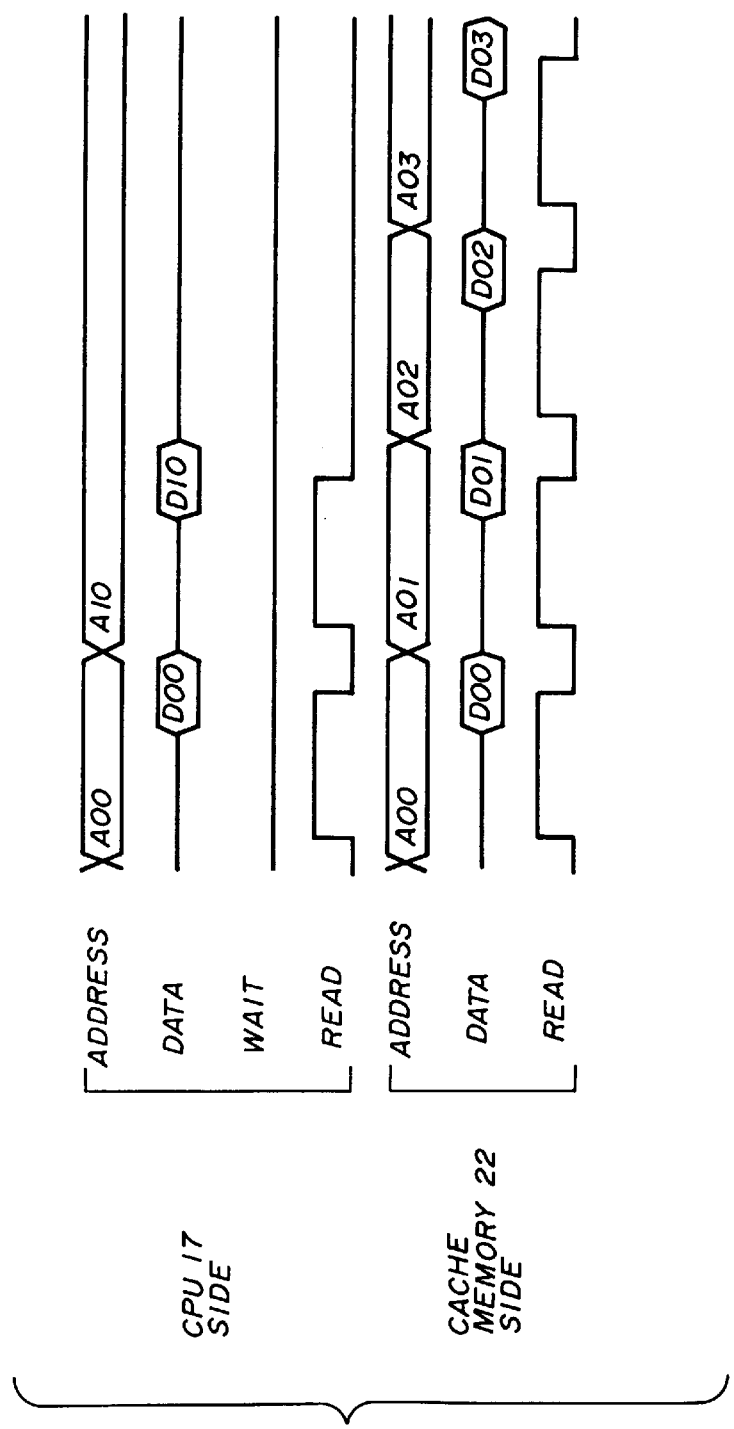
FIG. 13 is a block diagram of an operation of the information processing device shown in FIG. 12.
Figure 14:
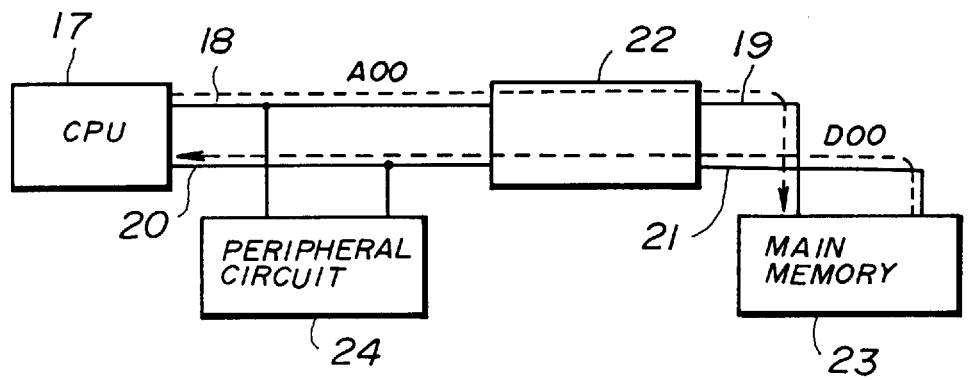
FIGS. 14 and 15 are block diagrams showing a block transfer operation of the information processing device shown in FIG. 12.
Figure 15:
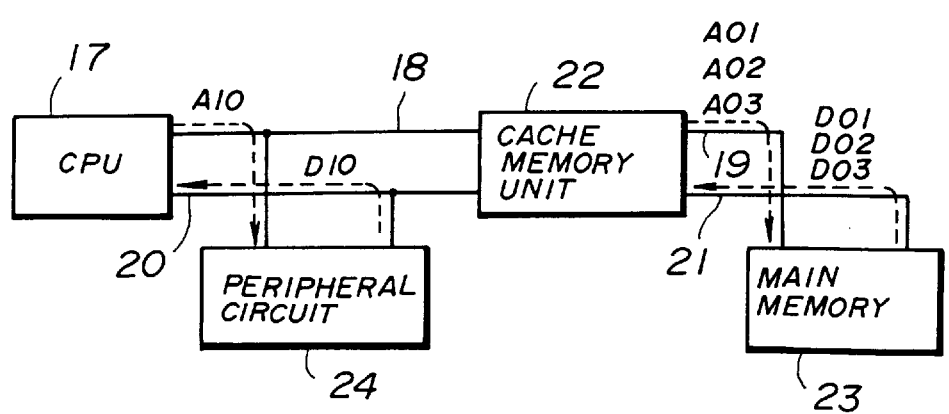

FIG. 13 is a timing chart of the block transfer operation of the cache memory unit 22 according to the second embodiment of the present invention. FIGS. 14 and 15 also show the block transfer operation. FIGS. 13, 14 and 15 relate to a case where data D00 is not indicated by address A00 in the cache memory unit 22, when a read access to address A00 of the cache memory unit 22 is requested by the CPU 17.

In this case, the read access to address A00 of the main memory 23 through the cache memory unit 22 is given by the CPU 17, as shown in FIGS. 13 and 14. Hence, data D00 (one block data) specified by address A00 is read from the main memory 23 and transferred to the cache memory unit 22 and the CPU 17. Thereafter, as shown in FIGS. 13 and 15, the read accesses to addresses A01, A02 and A03 of the main memory 23 from the cache memory unit 22 are sequentially carried out, and block data D01, D02 and D03 respectively specified by addresses A01, A02 and A03 are sequentially transferred to the cache memory unit 22 from the main memory 23.

The CPU 17 is in the waiting state until data D00 requested for itself is received. When the CPU 17 receives data D00, the CPU 17 can process data D00 while the block transfer of data D01, D02 and D03 is being performed.

If the CPU 17 needs a read access to address A10 of the peripheral circuit 24, the CPU 17 outputs address A10 even during the block transfer operation on data D01, D02 and D03. In response to address A10, corresponding data D10 is output from the peripheral circuit 24 and is transferred to the CPU 17. The peripheral circuit 24 may be a serial interface or a timer.

In the second embodiment of the present invention, the peripheral circuit 24 is connected to the address bus 18 and the data bus 20 connecting the CPU 17 and the cache memory 22 together. Hence, it is possible for the CPU 17 to access the peripheral circuit 24 and process data obtained therefrom even while data D01, D02 and D03 are being transferred to the cache memory unit 22 by the block transfer process. Hence, it is possible to speed up the operation of the CPU 17.

Figure 16:
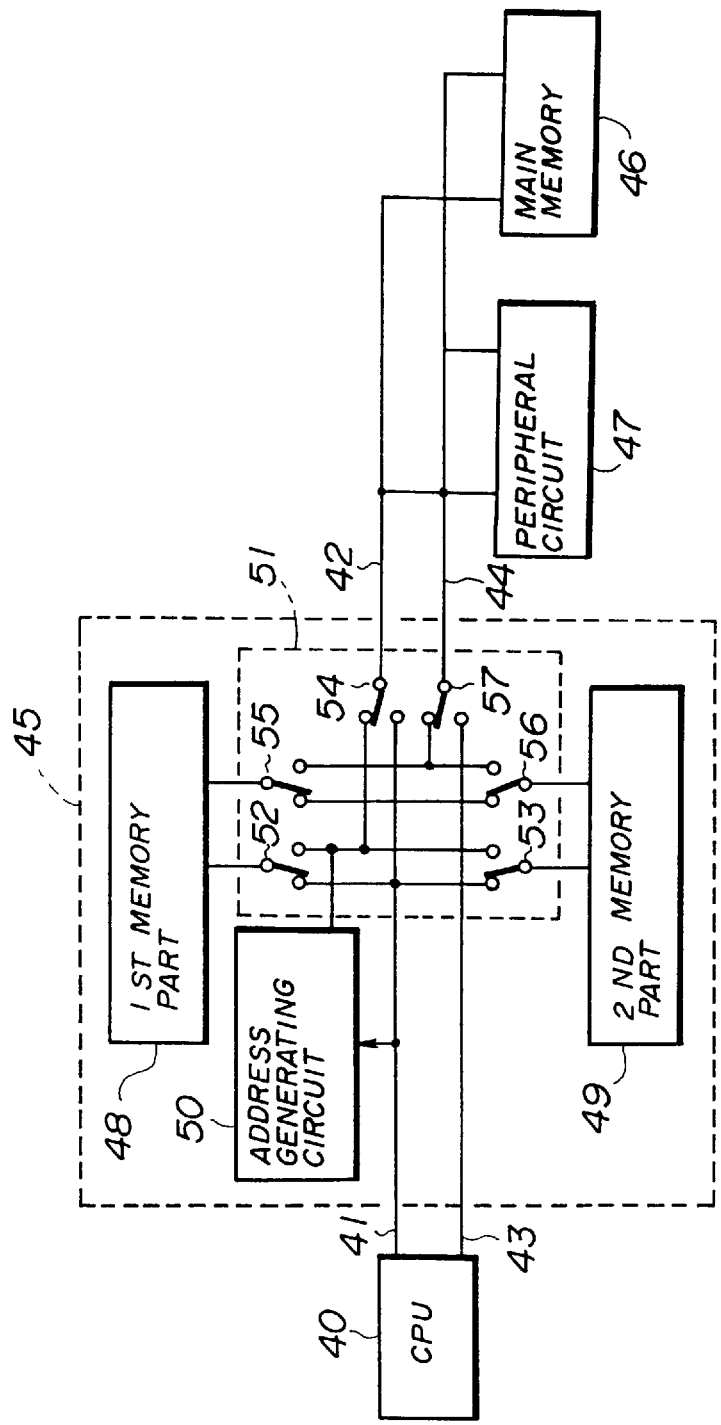
FIG. 16 is a block diagram of an information processing device according to a third embodiment of the present invention.

A description will now be given of an information processing device according to a third embodiment of the present invention. FIG. 16 shows such an information processing device, which includes a CPU 40, address buses 41 and 42, data buses 43 and 44, and a cache memory unit 45 having a two-way set associative structure. A main memory 46 is connected, an external device, to the information processing device.

The cache memory unit 45 includes a first memory part 48 and a second memory part 49, which can be independently set to a cache memory mode or a RAM mode. That is, each of the first and second memory parts 48 and 49 can operate as a cache memory or a RAM. The cache memory unit 45 includes an address generating circuit 50 and a bus switching circuit 51. The bus switching circuit 51 includes address bus switching circuits 52–54, and data bus switching circuits 55–57.

Figure 17:
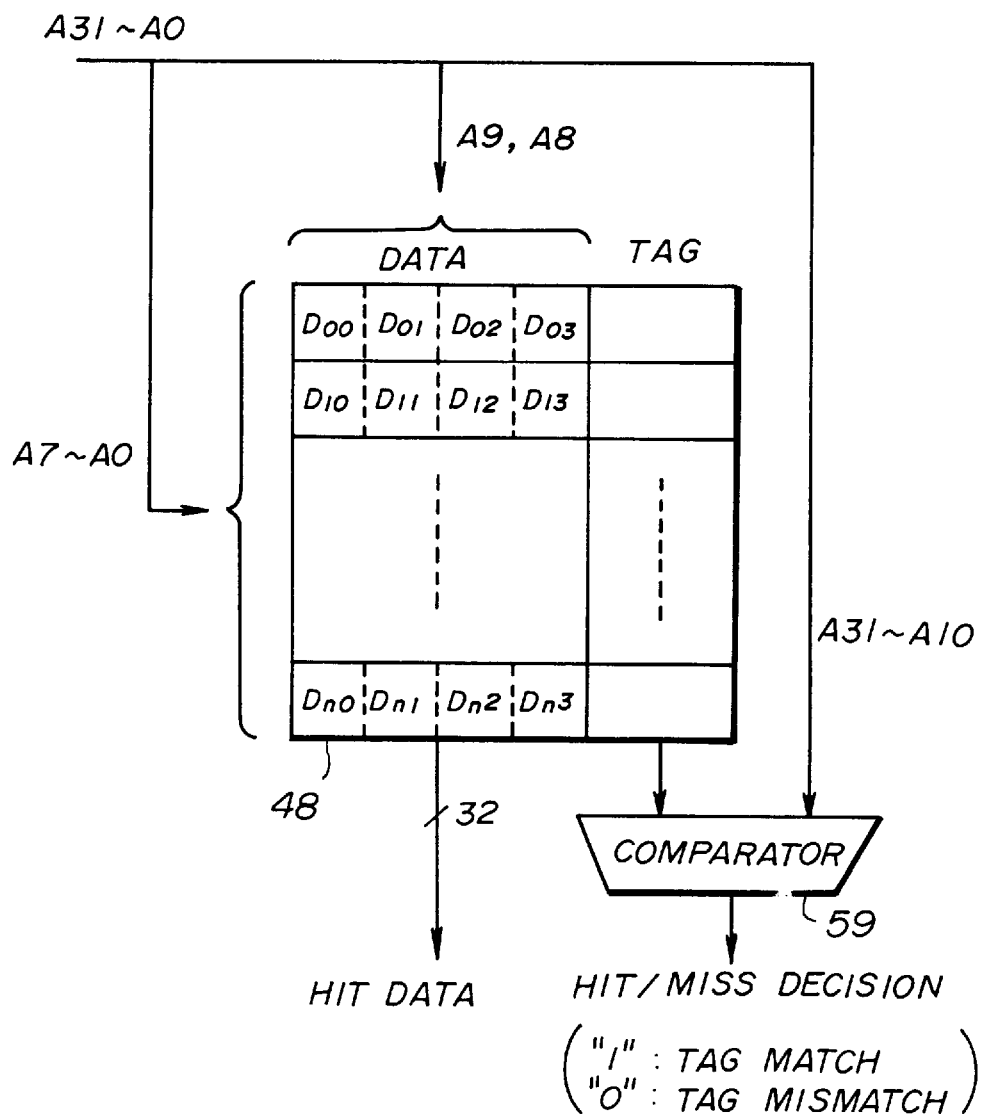
FIG. 17 is a block diagram of a mode setting in which a first memory part shown in FIG. 16 is set to a cache memory mode.

FIG. 17 is a block diagram of a peripheral part of the first memory part 48 related to the cache memory mode. The peripheral part shown in FIG. 17 includes a comparator circuit 59, which compares 22 upper bits A31–A10 among 32 CPU address bits A31–A0 supplied from the CPU 40 with address tag data stored in the first memory part 48. The comparison result is a hit/miss decision signal.

Eight lower address bits A7–A0 among the CPU address bits A31–A0 are applied to the first memory part 48, so that one of the blocks can be selected. The address bits A9 and A8 select data among a group of data in the selected block.

If the comparator circuit 59 determines that the 22 upper bits A31–A10 coincide with the address tag data, the hit/miss decision signal indicates "1". If not, the hit/miss decision signal indicates "0". In the case of the cache hit, a data line of 32 bits extends from the first memory part 48.

Figure 18:
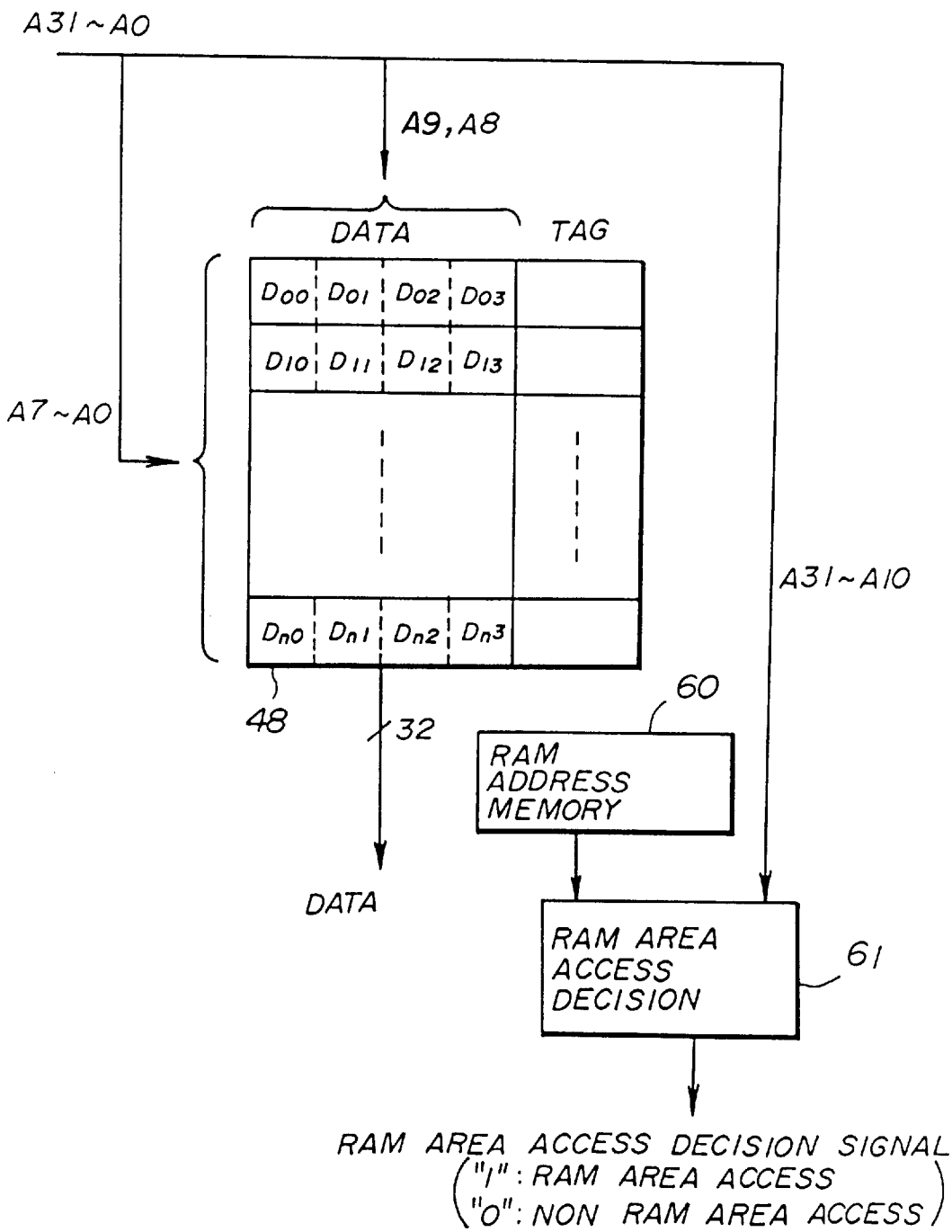
FIG. 18 is a block diagram of a mode setting in which the first memory part shown in FIG. 16 is set to a RAM mode.

FIG. 18 is a block diagram of a peripheral part of the first memory part 48 related to the RAM mode. The peripheral part shown in FIG. 18 includes a RAM address memory circuit 60 and a RAM area access decision circuit 61.

The RAM address memory circuit 60 stores the 22 upper bits of the 32-bit RAM address related to the first memory part 48. The RAM area access decision circuit 61 compares the 22 upper bits A31–A10 of the CPU address bits A31–A0 with the RAM address stored in the RAM address memory circuit 60 in order to determine whether the access by the CPU 40 is addressed to a RAM area. The comparison result serves as a RAM area access decision signal.

The eight lower address bits A7–A0 of the 32-bit CPU address are used to select one of the blocks, and the address bits A9 and A8 are used to specify data in the data group in the selected block. The 22 upper bits A31–A10 are compared with the RAM address stored in the RAM address memory circuit 60. When the access by the CPU 40 is the RAM area, the RAM area access decision signal indicates "1". When the access by the CPU 40 is not the RAM area, the RAM area access decision signal indicates "0".

Figure 19:
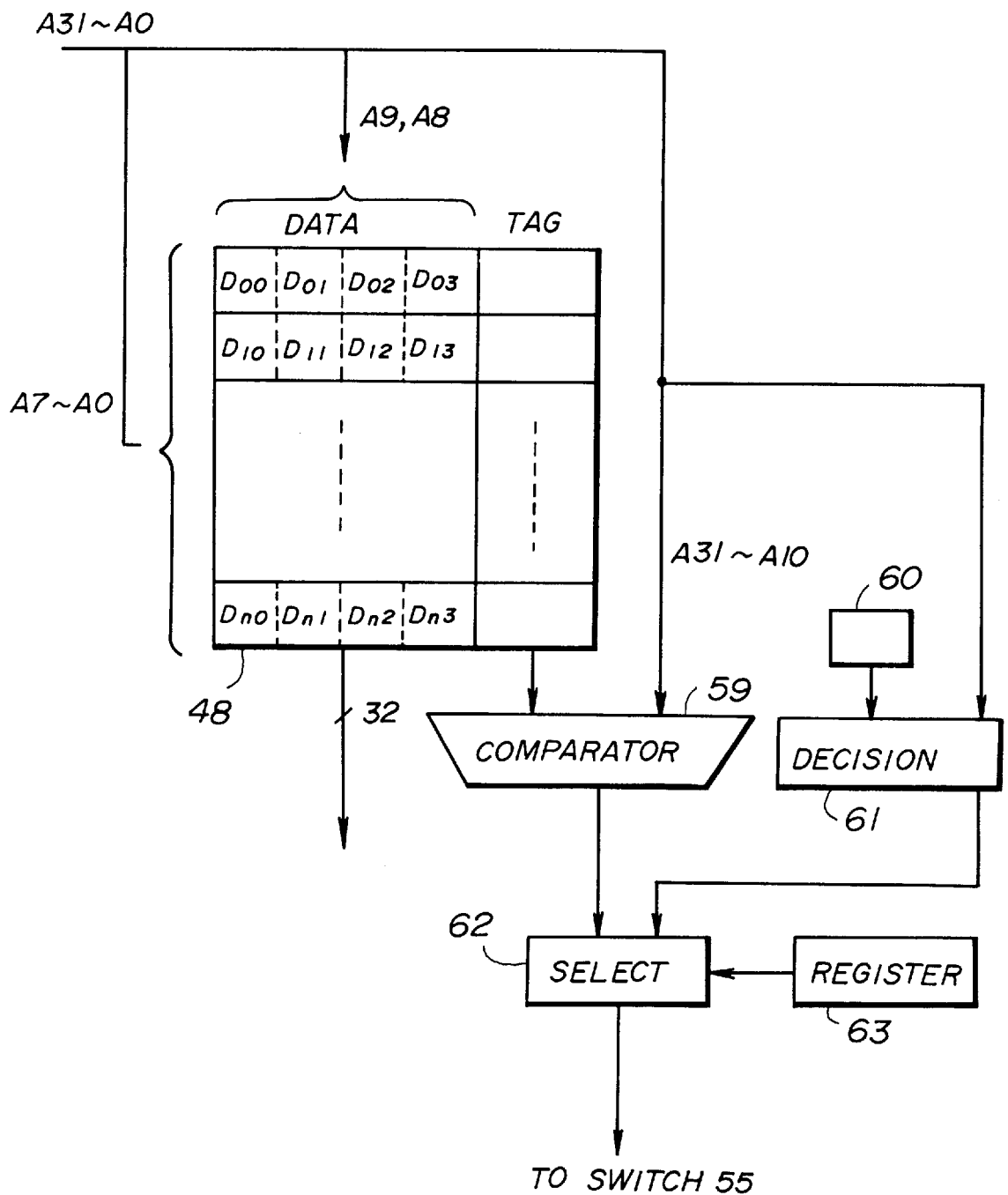
FIG. 19 is a block diagram of a peripheral circuit for the first memory part.

The peripheral circuits shown in FIGS. 17 and 18 are provided as shown in FIG. 19. A selector 62 selects either the comparator circuit 59 or the decision circuit 61 in accordance with a select bit stored in a register 63 by the user. The selected signal controls the bus switching circuit 55. The register 63 store other user writable select bits which control the other switching circuits 52, 53, 54, 56 and 57. Each of the switching circuits 52–57 can be formed by, for example, tri-state buffers.

Figure 20:
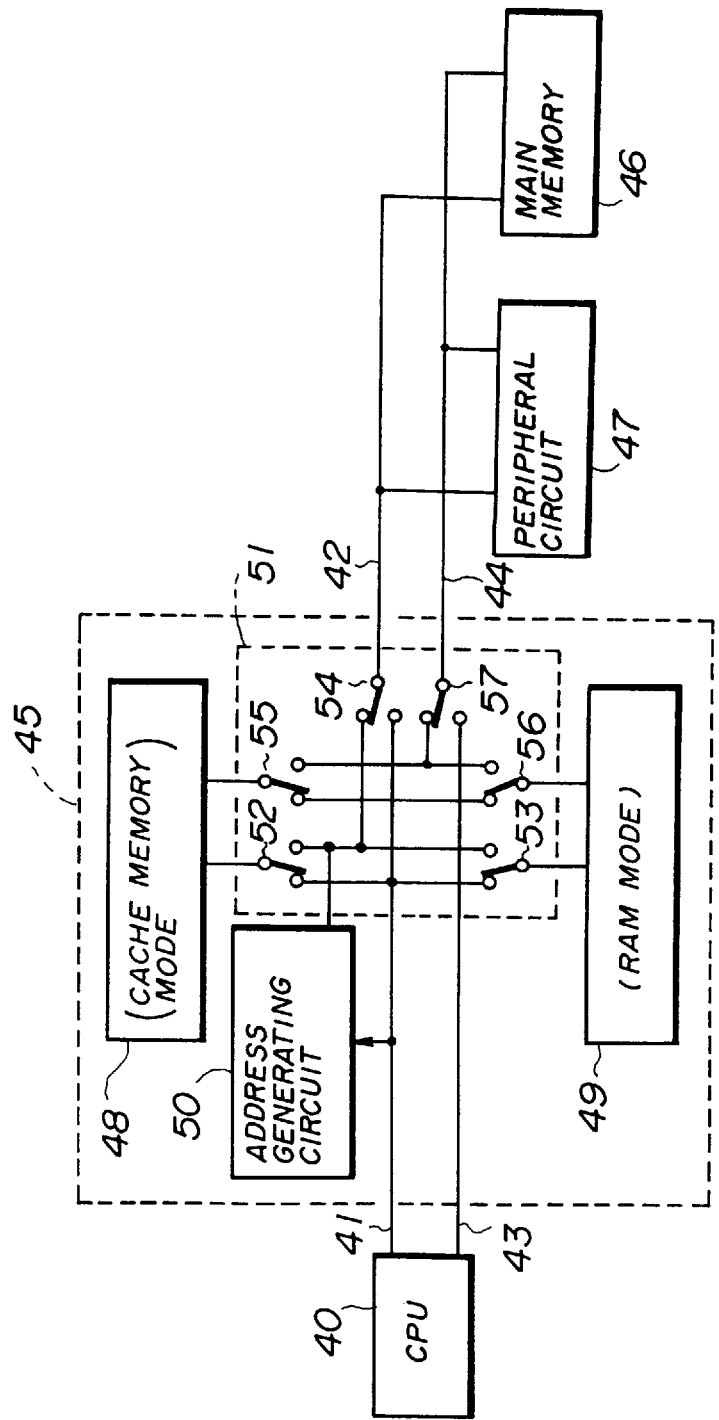
FIG. 20 is a block diagram of an operation of the information processing device shown in FIG. 16.

FIG. 20 is a block diagram showing a mode setting in which the first memory part 48 is set to the cache memory mode and the second memory part 49 is set to the RAM mode. The address bus switching circuits 52 and 54 connects the address bus 42 to the first memory part 48, and the address bus switching circuit 53 connects the address bus 41 to the second memory part 49. The data bus switching circuits 55 and 57 connect the data bus 44 to the first memory part 48, and the data bus switching circuit 56 connects the data bus 43 to the second memory part 49.

The CPU 40 is connected to the second memory part 49 via the address bus 41 and the data bus 43. The first memory part 48 is connected to the main memory 46 and the peripheral circuit 47 via the address bus 42 and the data bus 44. With the above structure, it is possible for the CPU 40 to perform a RAM access to the second memory part 49 even when the first memory part 48 is executing the block transfer operation from the main memory 46.

When the first memory part 48 is set to the RAM mode and the second memory part 49 is set to the cache memory mode, the CPU 40 can perform the RAM access to the first memory part 48 while the second memory part 49 is performing the block transfer operation from the main memory 46.

According to the third embodiment of the present invention, the RAM access to the memory part set to the RAM mode even when the memory part set to the cache memory mode is performing the memory transfer operation. Hence, it is possible to speed up the process.

Figure 21:
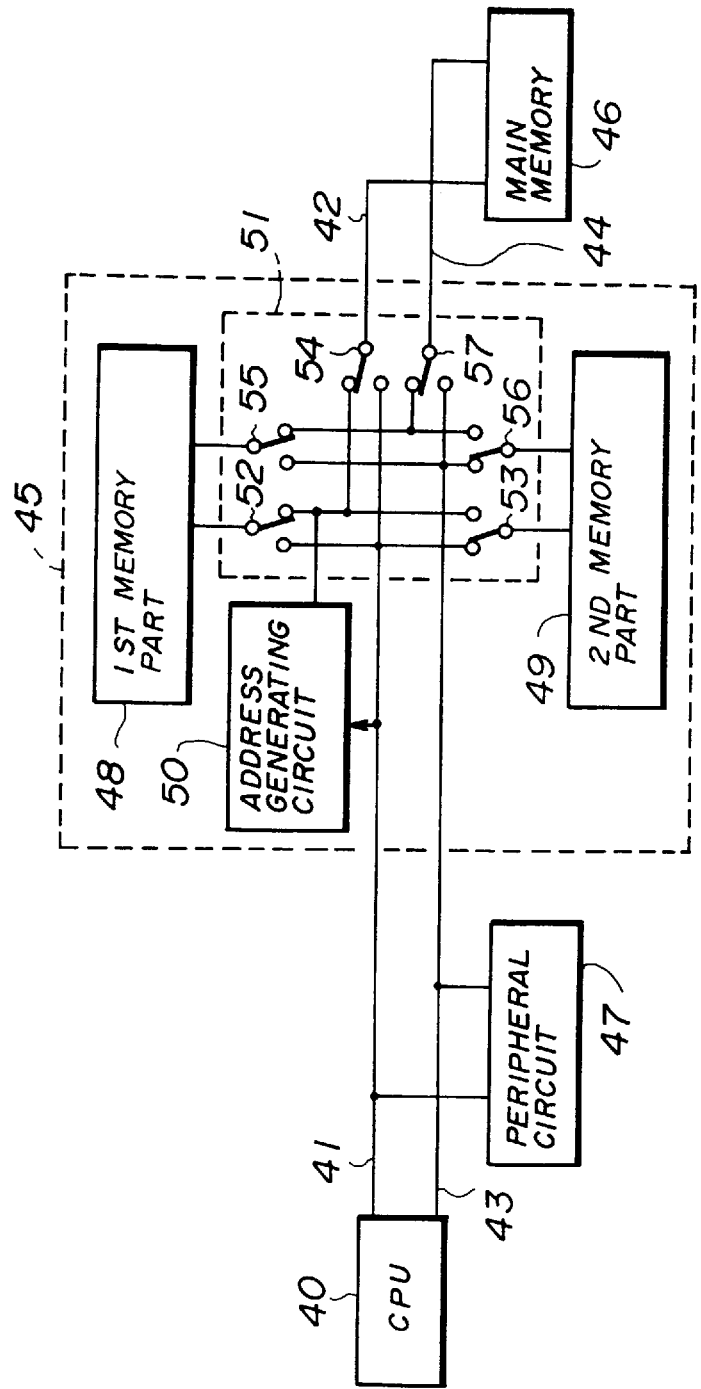
FIG. 21 is a block diagram of an information processing device according to a fourth embodiment of the present invention.

A description will now be given, with reference to FIG. 21, of an information processing device according to a fourth embodiment of the present invention. The information processing device shown in FIG. 21 is configured so that the peripheral circuit 47 is connected to the address bus 41 and the data bus 43. The other parts of the device shown in FIG. 21 are the same as those of the third embodiment of the present invention.

Figure 22:
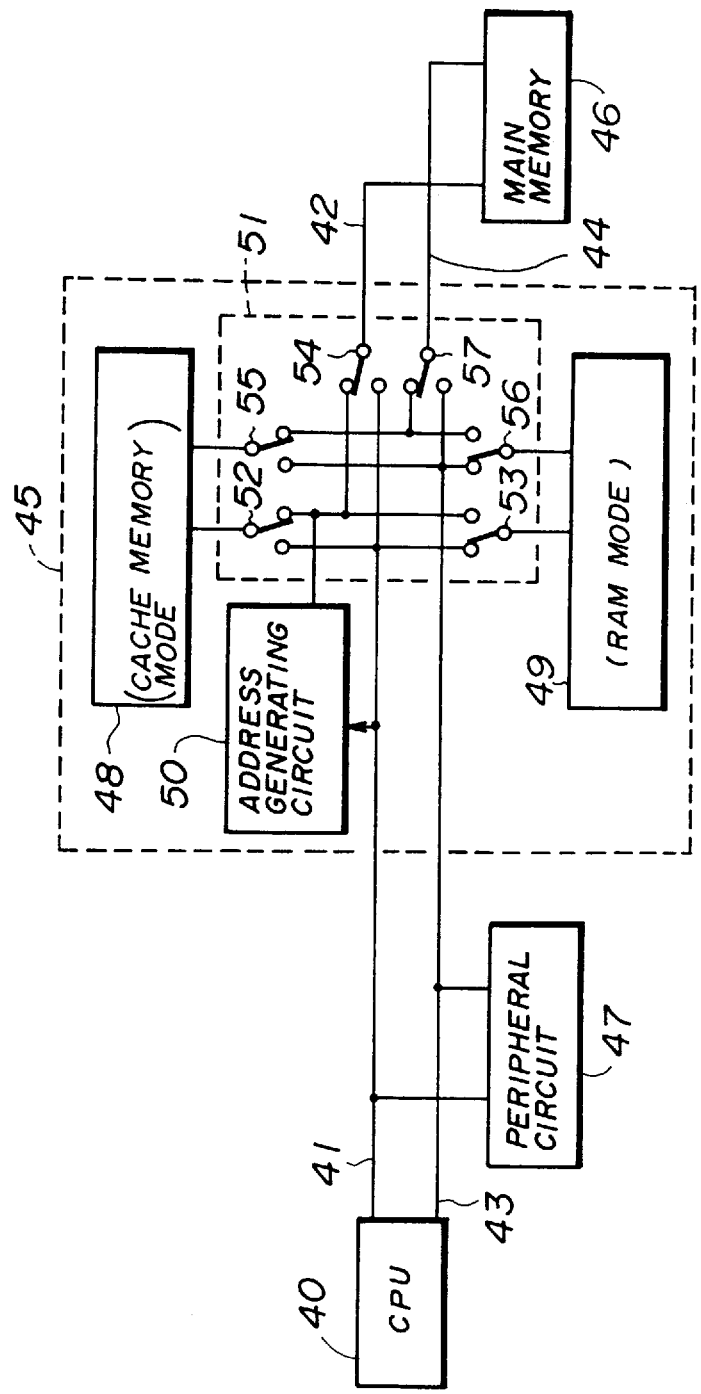
FIG. 22 is a block diagram of an operation of the information processing device shown in FIG. 21.

FIG. 22 is a block diagram showing a mode setting in which the first memory part 48 is set to the cache memory mode and the second memory part 49 is set to the RAM mode. In the case shown in FIG. 22, the address bus switching circuits 52 and 54 connect the address bus 42 to the first memory part 48, and the address bus switching circuit 53 connects the address bus 41 to the second memory part 49. The data bus switching circuits 55 and 57 connect the data bus 44 to the first memory part 48, and the data bus switching circuit 56 connects the data bus 43 to the second memory part 49.

The CPU 40 is coupled to the peripheral circuit 47 and the second memory part 49 via the address bus 41 and the data bus 43, and the first memory part 48 is coupled to the main memory 46 via the address bus 42 and the data bus 44. With the above structure, the CPU 40 can perform the RAM access to the second memory part 49 of the cache memory 45 or the access to the peripheral circuit 47 even when the first memory part 48 of the cache memory 45 is performing the block transfer from the main memory 46.

When the first memory part 48 is set to the RAM mode and the second memory part 49 is set to the cache memory mode, the CPU 40 can perform the RAM access to the first memory part 48 or the access to the peripheral circuit 47.

According to the fourth embodiment of the present invention, the RAM access to the memory part set to the RAM mode or the access to the peripheral circuit 47 can be performed even when the memory part set to the cache memory mode is performing the block transfer operation.

The present invention is not limited to the specifically disclosed embodiments, and variations and modifications may be made without departing from the scope of the present invention.

What is claimed is:

1. An information processing device comprising:

a central processing unit;

a cache memory unit;

a first decision circuit which identifies one of partitioned address areas to be accessed before the central processing unit accesses the cache memory unit; and a second decision circuit which determines whether said one of the partitioned address areas is a cachable area or a non-cachable area before address tag data is referred to in the cache memory unit, said second decision circuit comprising an area indication register circuit including a plurality of registers therein, each register of the plurality of registers corresponding to a respective one of the partitioned address areas, each of said registers containing information indicating whether the corresponding one of the partitioned address areas is cachable or non-cachable, and wherein said registers are rewritable, said second decision circuit also including a selector connected to the register circuit and to the first decision circuit, said selector outputting information corresponding to selected ones of the registers to the first decision circuit.

2. The information processing device as claimed in claim 1, wherein:

said first decision circuit is provided in said central processing unit; and said second decision circuit is provided in said cache memory unit.

3. The information processing device as claimed in claim 1, wherein said first decision circuit and said second decision circuit are provided in said central processing unit.

* * * * *